US012811896B2

(12) United States Patent
Li et al.

(10) Patent No.: US 12,811,896 B2
(45) Date of Patent: Nov. 24, 2026

(54) METHOD FOR CROSS-CARD LINK AGGREGATION OF VIRTUAL FUNCTION PORTS OF DATA PROCESSING UNITS, DEVICE AND MEDIUM

(71) Applicant: YUSUR Technology Co., Ltd., Beijing (CN)

(72) Inventors: Wei Li, Beijing (CN); Xu Sun, Beijing (CN)

(73) Assignee: YUSUR Technology Co., Ltd., Beijing (CN)

( * ) Notice: Subject to any disclaimer, the term of this patent is extended or adjusted under 35 U.S.C. 154(b) by 341 days.

(21) Appl. No.: 18/423,683

(22) Filed: Jan. 26, 2024

(65) Prior Publication Data

US 2024/0259331 A1 Aug. 1, 2024

(30) Foreign Application Priority Data

Jan. 30, 2023 (CN) ......................... 202310104331.9

(51) Int. Cl.
*H04L 49/00* (2022.01)
*H04L 49/112* (2022.01)

(52) U.S. Cl.
CPC ............ *H04L 49/70* (2013.01); *H04L 49/112* (2022.05)

(58) Field of Classification Search
None
See application file for complete search history.

(56) References Cited

U.S. PATENT DOCUMENTS

2012/0005521 A1 1/2012 Droux et al.
2014/0108584 A1 4/2014 Lu
(Continued)

FOREIGN PATENT DOCUMENTS

CN 105830401 A 8/2016
CN 107145310 A 9/2017
(Continued)

OTHER PUBLICATIONS

Hu Weiwen et al., "Implement of OVS Based on DPDK Technology", Journal of Network New Media, pp. 47-53, vol. 7 No. 1, Jan. 2018.

(Continued)

*Primary Examiner* — Elton Williams

(74) *Attorney, Agent, or Firm* — Bayramoglu Law Offices LLC

(57) ABSTRACT

The present disclosure relates to a method and a device for cross-card link aggregation of virtual function ports of DPUs, and a medium. The method includes: providing a plurality of data processing units, each of which is communicatively connected to a virtual machine and a switch respectively, performing link negotiation for the virtual machine and the switch respectively, acquiring a to-be-communicated data message, further determining a communication link for the to-be-communicated data message, where the communication link is a message channel between a virtual function port in the virtual machine, a virtual function port representor corresponding to the virtual function port in the virtual machine, an uplink corresponding to a physical port in the data processing unit, the physical port in the data processing unit, and the switch; and performing communication for the to-be-communicated data message based on the communication link.

13 Claims, 6 Drawing Sheets

(56) References Cited

U.S. PATENT DOCUMENTS

| | | | |
|---|---|---|---|
| 2015/0110105 A1 | 4/2015 | Kapur et al. | |
| 2017/0346680 A1* | 11/2017 | Ma | G06F 9/45558 |
| 2022/0050698 A1 | 2/2022 | Mansur et al. | |
| 2023/0012308 A1 | 1/2023 | Kommula et al. | |
| 2023/0319133 A1* | 10/2023 | Kutch | H04L 67/101<br>709/223 |

FOREIGN PATENT DOCUMENTS

| | | | |
|---|---|---|---|
| CN | 114531405 | A | 5/2022 |
| CN | 114553699 | A | 5/2022 |
| CN | 115237589 | A | 10/2022 |
| CN | 115567446 | A | 1/2023 |
| EP | 3236623 | A1 | 10/2017 |
| KR | 102420610 | B1 | 7/2022 |
| WO | WO2008011818 | A1 | 1/2008 |
| WO | WO2016101587 | A1 | 6/2016 |
| WO | WO2022088743 | A1 | 5/2022 |

OTHER PUBLICATIONS

Anonymous:"Link aggregation—Wikipedia—Version of Nov. 27, 2021",,Nov. 27, 2021(Nov. 27, 2021), XP055922812, Retrievedfrom the Internet:URL:https://en.wikipedia.org/w/index.php?title=Linkaggregation&oldid=1057438660 [retrieved on May 18, 2022].

Search report of EP 24153915.4 issued on Jun. 3, 2024.

Notice of Reasons for Refusal for Japanese Patent Application No. 2024-012120, Japan Patent Office, mailed on Dec. 10, 2024, 10 pages including English Translation.

Communication under Rule 71(3) EPC for European Patent Application No. 24153915.4, European Patent Office, mailed on Jan. 28, 2026, 42 pages.

* cited by examiner

METHOD FOR CROSS-CARD LINK AGGREGATION OF VIRTUAL FUNCTION PORTS OF DATA PROCESSING UNITS, DEVICE AND MEDIUM

CROSS REFERENCE

The present disclosure claims priority to Chinese application Ser. No. 202310104331.9 filed on Jan. 30, 2023, and entitled "METHOD AND APPARATUS FOR CROSS-CARD LINK AGGREGATION OF VIRTUAL FUNCTION PORTS OF DPUs, DEVICE, AND MEDIUM," all of which is incorporated herein by reference in its entirety.

TECHNICAL FIELD

The present disclosure relates to the technical field of computers, and particularly relates to a method and an apparatus for cross-card link aggregation of virtual function ports of DPUs, a device, and a medium.

BACKGROUND

A Data Processing Unit (DPU) is a new generation of a data-centered, I/O intensive computing chip, which supports infrastructure resource layer virtualization using a software-defined technical route, and functions to improve computing system efficiency, reduce total ownership costs of the whole system, improve data processing efficiency, and reduce performance losses of other computing chips.

At present, DPU cards divide a physical port (a MAC port) into several virtual function ports (Virtual Functions, VFs) for use by a virtual machine (VM) running on a host. Each of the VFs has a corresponding virtual function port representor (Virtual Function representor, VF rep), forming a combination of (VF, VF rep), where the VF rep is configured to transmit a message to a virtual switch (Open vSwitch OVS). The MAC port also has a corresponding uplink, forming a combination of (MAC, uplink), where the uplink is also configured to transmit a message to the OVS. The OVS processes and distributes messages passing through the OVS.

In existing technologies, there is only one DPU card, and VFs in each VM belongs to one DPU card. The traffic of all VFs needs to pass through the DPU card, thus resulting in a problem of single point of failure. Once the DPU card has hardware failure, network interruption will be caused, thus failing to ensure high availability.

SUMMARY

In order to solve the above technical problems, the present disclosure provides a method for cross-card link aggregation of virtual function ports of DPUs, a device, and a medium, thereby avoiding a problem of network interruption caused by single point of failure, and ensuring high availability.

One or more embodiments of the present disclosure provide a method for cross-card link aggregation of virtual function ports of DPUs, each of which is communicatively connected to a virtual machine and a switch respectively, the method including:

performing link negotiation for the virtual machine and the switch respectively;

acquiring a to-be-communicated data message, which includes a destination identifier, a source identifier, and a message type;

determining a communication link for the to-be-communicated data message, where the communication link is a message channel between a virtual function port in the virtual machine, a virtual function port representor corresponding to the virtual function port in the virtual machine, an uplink corresponding to a physical port in the data processing unit, the physical port in the data processing unit, and the switch; and performing communication for the to-be-communicated data message based on the communication link.

In some embodiments, the performing link negotiation for the virtual machine and the switch respectively includes:

acquiring a first negotiation message transmitted from the virtual machine and a second negotiation message transmitted from the switch;

forwarding the first negotiation message and the second negotiation message to a link aggregation controller based on a virtual switch; and processing the first negotiation message and the second negotiation message based on the link aggregation controller, providing a first response protocol message to the virtual machine, and providing a second response protocol message to the switch.

In some embodiments, the providing the first response protocol message to the virtual machine, and providing the second response protocol message to the switch includes:

transmitting the first response protocol message and the second response protocol message to the virtual switch;

forwarding, by the virtual switch, the first response protocol message to the virtual machine; and forwarding, by the virtual switch, the second response protocol message to the switch.

In some embodiments, the to-be-communicated data message includes at least one of:

a first data message transmitted from the virtual machine or a second data message transmitted from the switch.

In some embodiments, the acquiring the to-be-communicated data message includes:

transmitting the to-be-communicated data message to the virtual switch through the virtual function port representor corresponding to the virtual function port in the virtual machine; or transmitting the to-be-communicated data message to the virtual switch through the uplink corresponding to the physical port in the data processing unit; and obtaining the to-be-communicated data message based on the virtual switch.

In some embodiments, the determining the communication link for the to-be-communicated data message includes:

acquiring a correspondence between a preset destination identifier and a preset communication link; and determining a communication link corresponding to the destination identifier in the to-be-communicated data message from the correspondence.

In some embodiments, the performing communication for the to-be-communicated data message based on the communication link includes:

acquiring the destination identifier from the to-be-communicated data message based on the virtual switch; and forwarding the to-be-communicated data message through the communication link to a destination corresponding to the destination identifier based on the virtual switch.

One or more embodiments of the present disclosure provide an apparatus for cross-card link aggregation of virtual function ports of DPUs, each of which is communicatively connected to a virtual machine and a switch respectively. The apparatus includes:

a negotiation module configured to perform link negotiation for the virtual machine and the switch respectively;

an acquisition module configured to acquire a to-be-communicated data message, which includes a destination identifier, a source identifier, and a message type;

a determination module configured to determine a communication link for the to-be-communicated data message, where the communication link is a message channel between a virtual function port in the virtual machine, a virtual function port representor corresponding to the virtual function port in the virtual machine, an uplink corresponding to a physical port in the data processing unit, the physical port in the data processing unit, and the switch; and a communication module configured to perform communication for the to-be-communicated data message based on the communication link.

One or more embodiments of the present disclosure provide an electronic device, including: a memory, a processor, and a computer program. The computer program is stored in the memory, and is configured to be executed by the processor to implement the method in the first aspect.

One or more embodiments of the present disclosure provide a computer-readable storage medium storing a computer program thereon, where the computer program is executed by a processor to implement the method in the first aspect.

One or more embodiments of the present disclosure further provide a computer program product including a computer program or instruction, where the computer program or instruction, when executed by a processor, implements the method in the first aspect.

The method and the apparatus for cross-card link aggregation of virtual function ports of DPUs, the device, and the medium provided in embodiments of the present disclosure provide a plurality of data processing units, each of which is communicatively connected to a virtual machine and a switch respectively, perform link negotiation for the virtual machine and the switch respectively, acquire a to-be-communicated data message, which includes a destination identifier, a source identifier, and a message type, determine a communication link for the to-be-communicated data message, where the communication link is a message channel between a virtual function port in the virtual machine, a virtual function port representor corresponding to the virtual function port in the virtual machine, an uplink corresponding to a physical port in the data processing unit, the physical port in the data processing unit, and the switch, and perform communication for the to-be-communicated data message based on the communication link. Because the plurality of data processing units is provided, and each of the data processing units is communicatively connected to the virtual machine and the switch respectively, the message can be communicated through a plurality of communication links, thereby avoiding a problem of network interruption caused by single point of failure, and ensuring high availability.

BRIEF DESCRIPTION OF DRAWINGS

The drawings here are incorporated into the description, form a part of the description, show embodiments in accordance with the present disclosure, and are used together with the description to explain the principles of the present disclosure.

To more clearly describe technical solutions of embodiments of the present disclosure or existing technologies, drawings to be used in the description of the embodiments or the existing technologies will be briefly introduced below. Apparently, for those of ordinary skills in the art, other drawings may also be obtained based on these drawings without making creative work.

DESCRIPTION OF EMBODIMENTS

In order to make the above objectives, features, and advantages of the present disclosure clearer, solutions of the present disclosure will be further described below. It should be noted that the embodiments of the present disclosure and the features in the embodiments may be combined with each other on a non-conflict basis.

Many specific details are elaborated in the description below to facilitate a full understanding of the present disclosure, but the present disclosure may also be implemented in other ways different from those described herein; and obviously, the embodiments in the description are only a part of embodiments, rather than all embodiments, of the present disclosure.

A data processing unit is a new generation of a data-centered, I/O intensive computing chip, which supports infrastructure resource layer virtualization using a software-defined technical route, and functions to improve computing system efficiency, reduce total ownership costs of the whole system, improve data processing efficiency, and reduce performance losses of other computing chips.

At present, DPU cards divide a physical port (MAC port) into several virtual function ports (Virtual Functions, VFs) for use by a virtual machine (VM) running on a host. Each of the VFs has a corresponding virtual function port representor (Virtual Function representor, VF rep), forming a combination of (VF, VF rep), where the VF rep is configured to transmit a message to a virtual switch (Open vSwitch, OVS). The MAC port also has a corresponding uplink, forming a combination of (MAC, uplink), where the uplink is also configured to transmit a message to the OVS. The OVS processes and distributes messages passing through the OVS.

In existing technologies, there is only one DPU card, and VFs in each VM belongs to one DPU card. The traffic of all VFs needs to pass through the DPU card, thus resulting in a problem of single point of failure. Once the DPU card has hardware failure, network interruption will be caused, thus failing to ensure high availability. In response to this problem, an embodiment of the present disclosure provides a method for cross-card link aggregation of virtual function ports of DPUs. The method will be introduced below with reference to specific embodiments.

Figure 1:
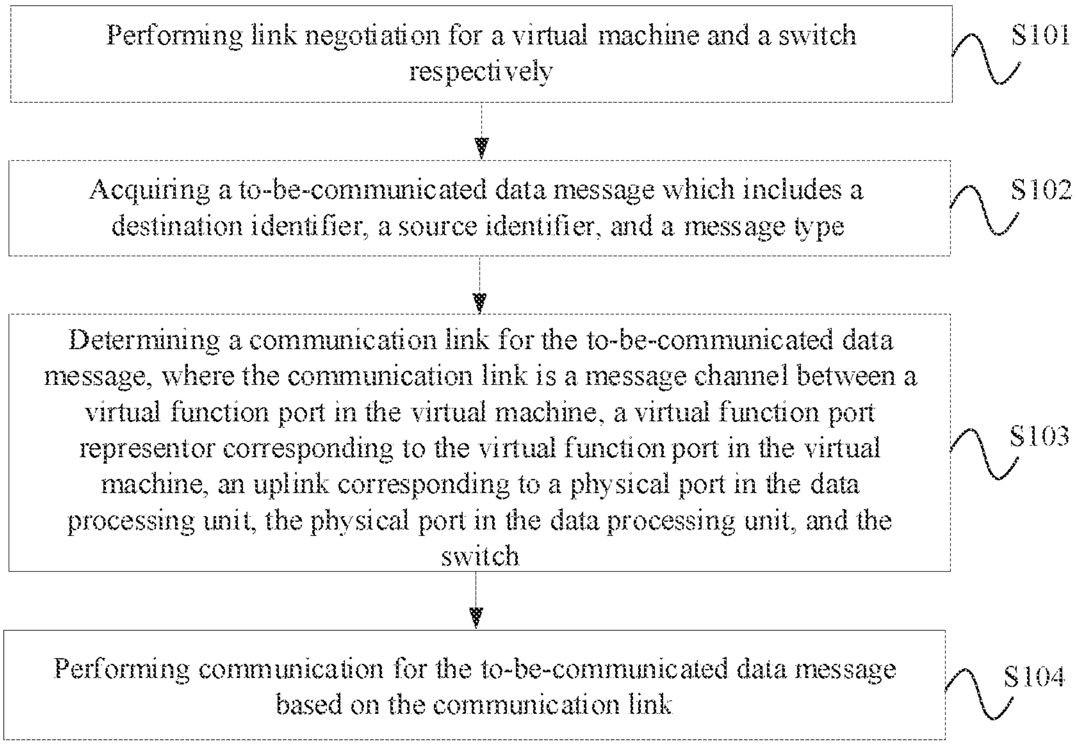
FIG. 1 is a flowchart of a method for cross-card link aggregation of virtual function ports of DPUs provided in an embodiment of the present disclosure.

FIG. 1 is a flowchart of a method for cross-card link aggregation of virtual function ports of DPUs provided in an embodiment of the present disclosure. This method can be applied to an electronic device, such as a computer or a notebook computer. This method can be applied to a scenario where message communication is performed based on a plurality of data processing units, thereby avoiding a problem of network interruption caused by single point of failure, and ensuring high availability. It is understandable that the method for cross-card link aggregation of virtual function ports of DPUs provided in the embodiment of the present disclosure may also be applied to other scenarios.

The method for cross-card link aggregation of virtual function ports of DPUs shown in FIG. 1 will be introduced below with reference to FIG. 2. The method includes the following steps:

S101: performing link negotiation for a virtual machine and a switch respectively.

In some optional embodiments, an electronic device is provided with at least two data processing units, each of which is communicatively connected to a virtual machine and a switch respectively. An upper VF of two DPU cards is directly connected to a VM, a logical (bond) port is formed inside the VM, and the physical ports links in the two DPU cards are aggregated to jointly transceive network traffic. In this step, as shown in FIG. 2, the electronic device performs link negotiation for the virtual machine and the switch respectively, that is, dynamic negotiation for a bond between the DPU and the VM, or a bond between the DPU and the switch. For example, the negotiation is performed by transmitting a negotiation message and providing a negotiation message. After negotiation, the switch can transmit a data message through two routes, and the VM can receive the data message through two routes. Similarly, a message transmitted from the VM will also reach the switch through two routes.

Link Aggregation means that a plurality of network interfaces is aggregated, thus forming a logical port (bond port), to achieve load balancing of outcoming/incoming traffic throughput at each member port. When a link failure is detected at one of the member ports, messages are stopped from being transmitted at this port, and a transmitting port for the messages is recomputed from the remaining links based on a load balancing strategy. After the faulty port is restored, the port serves as a transceiving port again. The link aggregation can increase link bandwidth, link redundancy, and the like.

S102: acquiring a to-be-communicated data message, which includes a destination identifier, a source identifier, and a message type.

The electronic device acquires the to-be-communicated data message, which includes the destination identifier, the source identifier, and the message type. The to-be-communicated data message may be transmitted from the switch to the virtual machine; or may be transmitted from the virtual machine to the switch. The to-be-communicated data message includes the destination identifier, the source identifier, and the message type. The message type includes a negotiation message, a data message, etc. The source identifier represents an identifier of a transmitting terminal of the to-be-communicated data message, while the destination identifier represents an identifier of a receiving terminal of the to-be-communicated data message.

S103: determining a communication link for the to-be-communicated data message, where the communication link is a message channel between a virtual function port in the virtual machine, a virtual function port representor corresponding to the virtual function port in the virtual machine, an uplink corresponding to a physical port in the data processing unit, the physical port in the data processing unit, and the switch.

Figure 5:
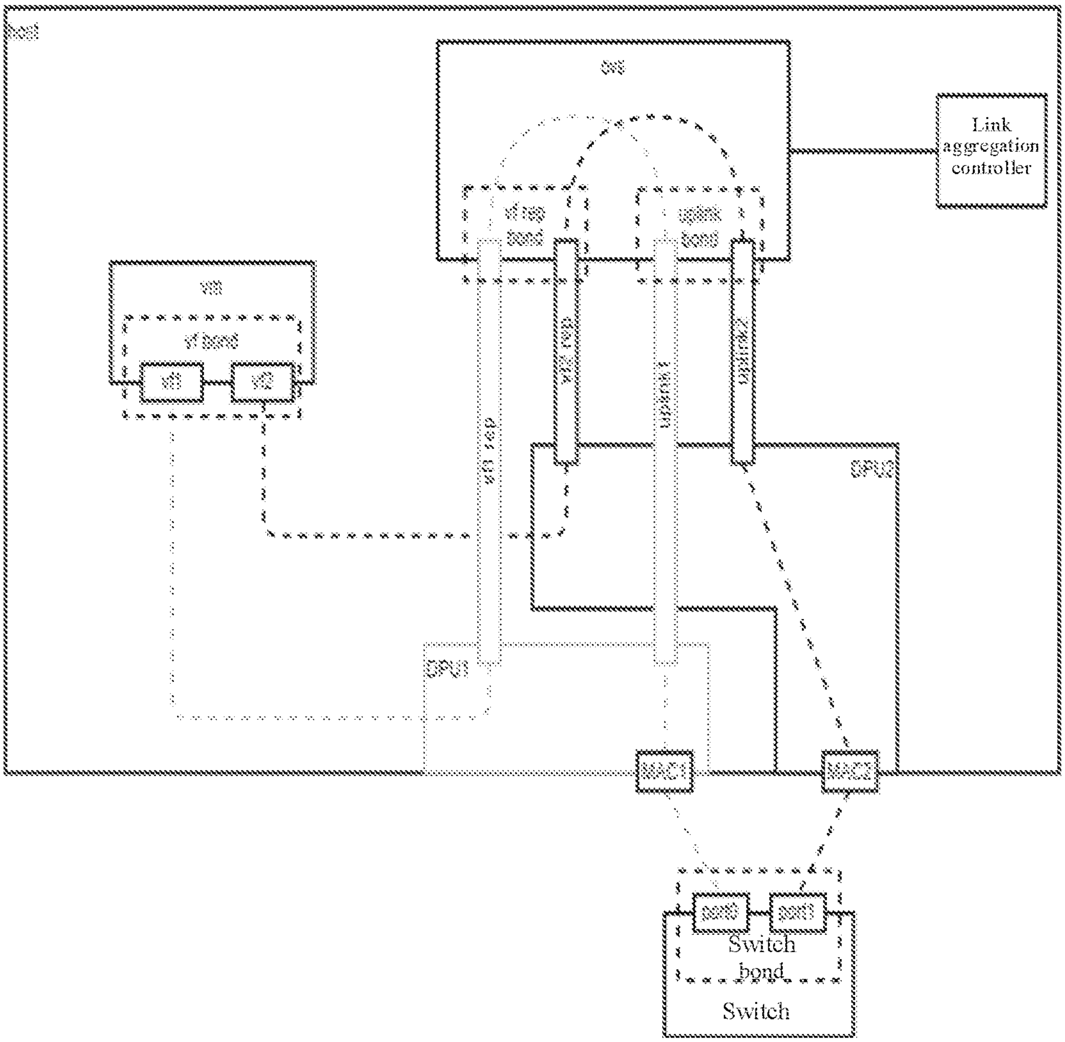
FIG. 5 is a schematic diagram of a data message communication process provided in an embodiment of the present disclosure.

Because the electronic device is provided with at least two data processing units, each of which is communicatively connected to a virtual machine and a switch respectively, routes for transceiving messages from a plurality of VFs in the VM belong to different DPU cards, and form a plurality of links. In the present embodiment, the electronic device determines the communication link for the to-be-communicated data message. The communication link is a message channel between a virtual function port in the virtual machine, a virtual function port representor corresponding to the virtual function port in the virtual machine, an uplink corresponding to a physical port in the data processing unit, the physical port in the data processing unit, and the switch. As shown in FIG. 5, the message route is bidirectional, that is, the data message can be transmitted from the virtual function port in the virtual machine, to the virtual function port representor corresponding to the virtual function port in the virtual machine, to the uplink corresponding to the physical port in the data processing unit, to the physical port in the data processing unit, and finally to the switch; or the data message can be transmitted from the switch to the physical port in the data processing unit, to the uplink corresponding to the physical port in the data processing unit, to the virtual function port representor corresponding to the virtual function port in the virtual machine, and finally to the virtual function port in the virtual machine.

S104: performing communication for the to-be-communicated data message based on the communication link.

In the present embodiment, the electronic device performs communication for the to-be-communicated data message based on the communication link. Because the electronic device is provided with at least two data processing units, each of which is communicatively connected to a virtual machine and a switch respectively, routes for transceiving messages from a plurality of VFs in the VM belong to different DPU cards, and form a plurality of links. The message can be communicated through a plurality of communication links, thus solving the problem of single point of failure in existing technologies.

In some embodiments, a user can perform load balancing configuration on the virtual function ports in the virtual machine, so that the virtual machine balances loads to be transmitted through the plurality of VFs based on the load balancing configuration. In some embodiments, the user can perform configuration on traffic of the virtual function ports on the virtual machine, so that the virtual machine balances traffic to be transmitted through the plurality of VFs based on the traffic configuration.

In some embodiments, the user can perform load balancing configuration on the network interfaces on the switch, so that the switch balance loads to be transmitted through the plurality of VFs based on the load balancing configuration. In some embodiments, the user can perform configuration on traffic of the network interfaces on the switch, so that the switch balances traffic to be transmitted through the plurality of VFs based on the traffic configuration.

In embodiments of the present disclosure, a plurality of data processing units is provided, each of the data processing units is communicatively connected to a virtual machine and a switch respectively, link negotiation is performed for the virtual machine and the switch respectively, a to-be-communicated data message is acquired, the to-be-communicated data message includes a destination identifier, a source identifier, and a message type, a communication link for the to-be-communicated data message is determined, where the communication link is a message channel between a virtual function port in the virtual machine, a virtual function port representor corresponding to the virtual function port in the virtual machine, an uplink corresponding to a physical port in the data processing unit, the physical port in the data processing unit, and the switch, and communication is performed for the to-be-communicated data message based on the communication link. Because the plurality of data processing units is provided, and each of the data processing units is communicatively connected to the virtual machine and the switch respectively, the message can be communicated through a plurality of communication links, thereby avoiding a problem of network interruption caused by single point of failure, and ensuring high availability.

Figure 3:
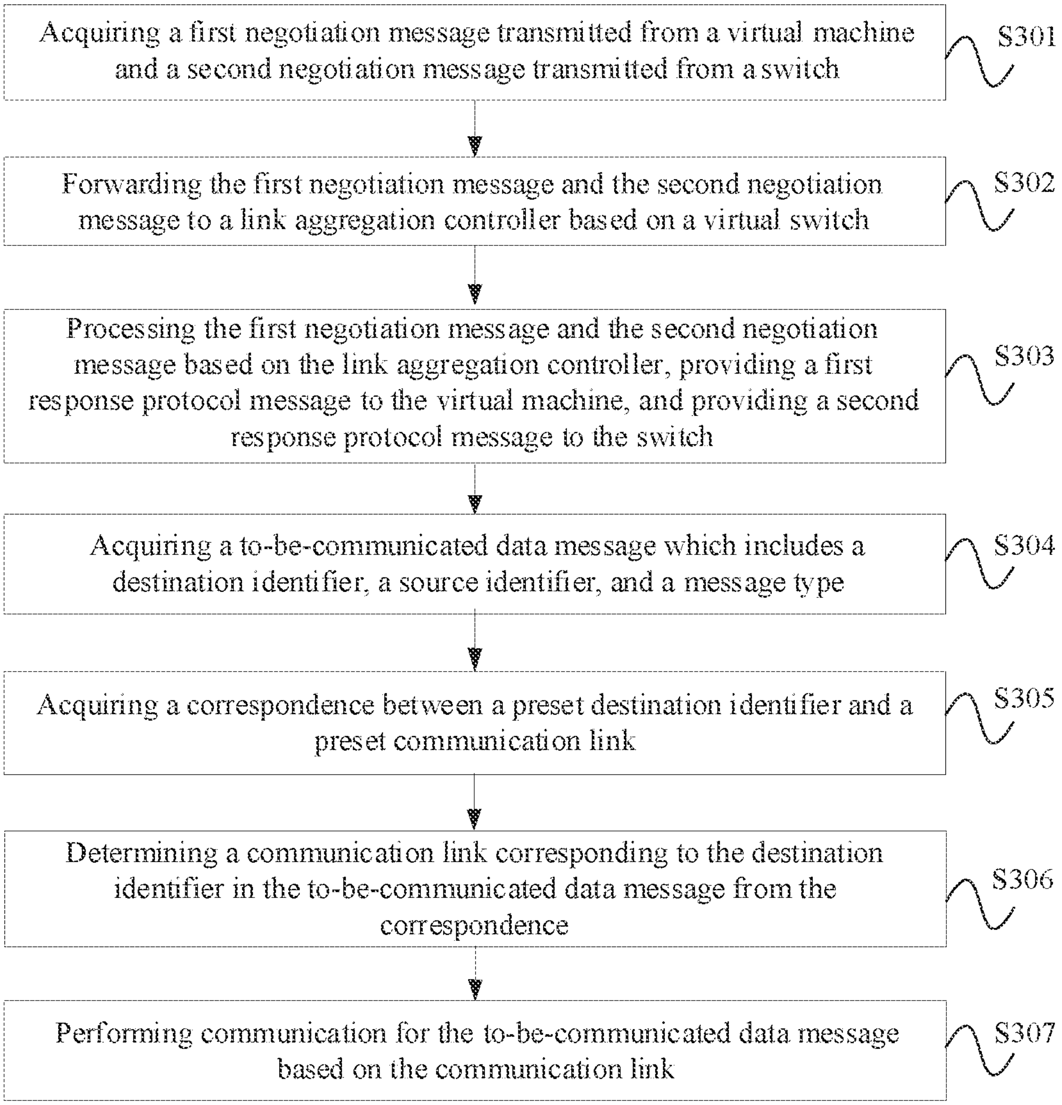
FIG. 3 is a flowchart of the method for cross-card link aggregation of virtual function ports of DPUs provided in another embodiment of the present disclosure.

FIG. 3 is a flowchart of the method for cross-card link aggregation of virtual function ports of DPUs provided in another embodiment of the present disclosure. As shown in FIG. 3, the method includes the following steps:

S301: acquiring a first negotiation message transmitted from a virtual machine and a second negotiation message transmitted from a switch.

An electronic device acquires the first negotiation message transmitted from the virtual machine and the second negotiation message transmitted from the switch. As shown in FIG. 2, the virtual machine will regularly transmit the first negotiation message, the switch will regularly transmit the second negotiation message, and a virtual switch in the electronic device can acquire the first negotiation message transmitted from the virtual machine and the second negotiation message transmitted from the switch. The first negotiation message includes status information, a source identifier, and a destination identifier of each virtual function port of the virtual machine, and the second negotiation message includes status information, a source identifier, and a destination identifier of each physical port of the switch.

S302: forwarding the first negotiation message and the second negotiation message to a link aggregation controller based on a virtual switch.

After acquiring the first negotiation message transmitted from the virtual machine and the second negotiation message transmitted from the switch, the electronic device forwards the first negotiation message and the second negotiation message to the link aggregation controller based on the virtual switch.

S303: processing the first negotiation message and the second negotiation message based on the link aggregation controller, providing a first response protocol message to the virtual machine, and providing on a second response protocol message to the switch.

Further, the electronic device processes the first negotiation message and the second negotiation message based on the link aggregation controller, provides the first response protocol message to the virtual machine, and provides the second response protocol message to the switch. As shown in FIG. 2, both a negotiation message transmitted from the bond of the switch and a negotiation message transmitted from the bond of the virtual function port will be sent to the link aggregation controller for unified processing, and the link aggregation controller will provide the first response protocol message to the virtual machine and provide on the second response protocol message to the switch.

In some embodiments, the providing the first response protocol message to the virtual machine, and providing the second response protocol message to the switch in S303 include, but are not limited to, S3031, S3032, and S3033:

S3031: transmitting the first response protocol message and the second response protocol message to the virtual switch.

Figure 2:
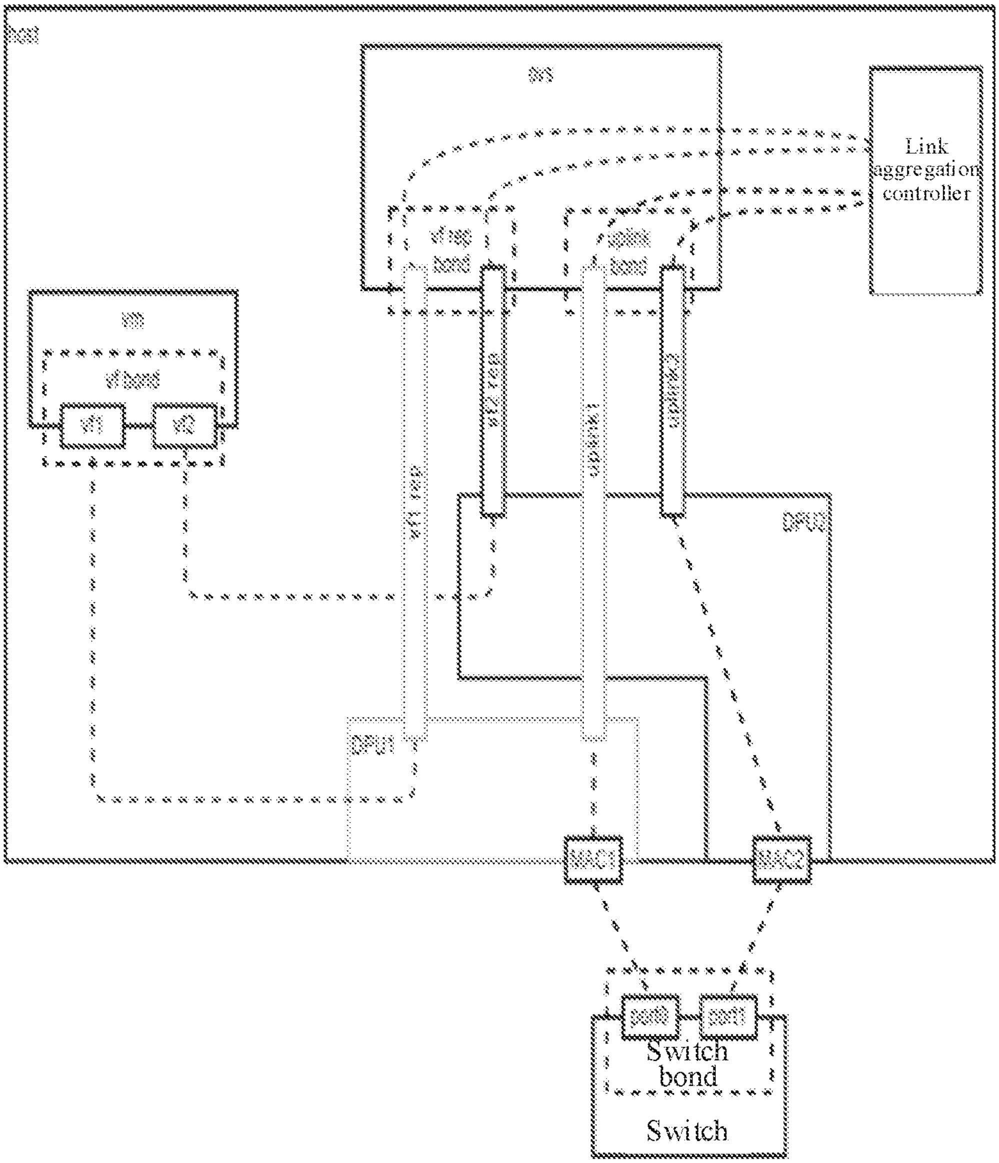
FIG. 2 is a schematic diagram of a link negotiation process provided in an embodiment of the present disclosure.

As shown in FIG. 2, the link aggregation controller in the electronic device transmits the first response protocol message and the second response protocol message to the virtual switch (Open VSwitch, OVS). The virtual switch undertakes a task of forwarding the message, and is equivalent to a message transfer station.

S3032: forwarding, by the virtual switch, the first response protocol message to the virtual machine.

After receiving the first response protocol message, the virtual switch in the electronic device forwards the first response protocol message to the virtual machine.

S3033: forwarding, by the virtual switch, the second response protocol message to the switch.

After receiving the second response protocol message, the virtual switch in the electronic device forwards the second response protocol message to the virtual machine.

S304: acquiring a to-be-communicated data message, which includes a destination identifier, a source identifier, and a message type.

Specifically, the implementation process and principle of S304 are same as those of S102, and will not be repeated here.

In some embodiments, the to-be-communicated data message includes at least one of: a first data message transmitted from the virtual machine or a second data message transmitted from the switch. That is, the to-be-communicated data message may be the first data message transmitted from the virtual machine, or may be the second data message transmitted from the switch.

S305: acquiring a correspondence between a preset destination identifier and a preset communication link.

In some embodiments, the electronic device stores the correspondence between the preset destination identifier and the preset communication link. The electronic device acquires the correspondence between the preset destination identifier and the preset communication link, the destination identifier corresponding to one or more communication links, that is, the message can be communicated through a plurality of communication links, thus solving the problem of single point of failure in existing technologies.

S306: determining a communication link corresponding to the destination identifier in the to-be-communicated data message from the correspondence.

After acquiring the correspondence between the preset destination identifier and the preset communication link, the electronic device can determine the communication link corresponding to the destination identifier in the to-be-communicated data message from the correspondence.

S307: performing communication for the to-be-communicated data message based on the communication link.

Specifically, the implementation process and principle of S307 are same as those of S104, and will not be repeated here.

In embodiments of the present disclosure, the first negotiation message transmitted from the virtual machine and the second negotiation message transmitted from the switch are acquired, the first negotiation message and the second negotiation message are forwarded to the link aggregation controller based on the virtual switch, the first negotiation message and the second negotiation message are processed based on the link aggregation controller, the first response protocol message is provided to the virtual machine, and the second response protocol message is provided to the switch. Further, the to-be-communicated data message is acquired, where the to-be-communicated data message includes the destination identifier, the source identifier, and the message type, the correspondence between the preset destination identifier and the preset communication link is acquired, and the communication link corresponding to the destination identifier in the to-be-communicated data message is determined from the correspondence. Then, the to-be-communicated data message is communicated based on the communication link. Because the plurality of data processing units is provided, and each of the data processing units is communicatively connected to the virtual machine and the switch respectively, the message can be communicated through a plurality of communication links, thereby avoiding a problem of network interruption caused by single point of failure, and ensuring high availability.

Figure 4:
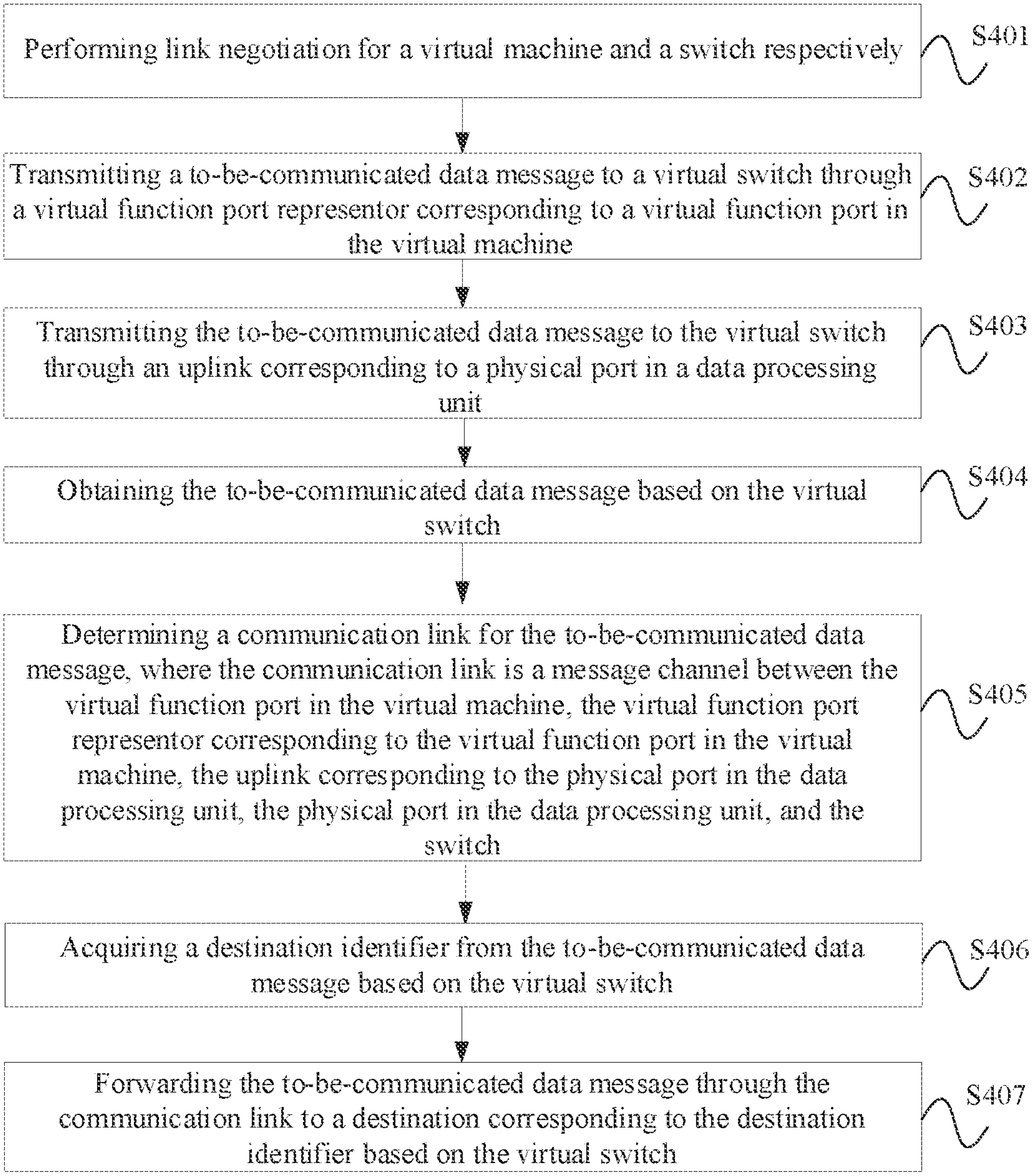
FIG. 4 is a flowchart of the method for cross-card link aggregation of virtual function ports of DPUs provided in still another embodiment of the present disclosure.

FIG. 4 is a flowchart of the method for cross-card link aggregation of virtual function ports of DPUs provided in still another embodiment of the present disclosure. As shown in FIG. 4, the method includes the following steps:

S401: performing link negotiation for a virtual machine and a switch respectively.

Specifically, the implementation process and principle of S401 are same as those of S101, and will not be repeated here.

S402: transmitting a to-be-communicated data message to a virtual switch through a virtual function port representor corresponding to a virtual function port in the virtual machine.

As shown in FIG. 5, an electronic device transmits the to-be-communicated data message to the virtual switch (OVS) through the virtual function port representor (VF rep) corresponding to the virtual function port in the virtual machine.

S403: transmitting the to-be-communicated data message to the virtual switch through an uplink corresponding to a physical port in a data processing unit.

As shown in FIG. 5, the electronic device transmits the to-be-communicated data message to the virtual switch (OVS) through the uplink corresponding to the physical port in the data processing unit.

S404: obtaining the to-be-communicated data message based on the virtual switch.

Further, the electronic device acquires the to-be-communicated data message from the virtual switch.

S405: determining a communication link for the to-be-communicated data message, where the communication link is a message channel between the virtual function port in the virtual machine, the virtual function port representor corresponding to the virtual function port in the virtual machine, the uplink corresponding to the physical port in the data processing unit, the physical port in the data processing unit, and the switch.

Specifically, the implementation process and principle of S405 are same as those of S103, and will not be repeated here.

S406: acquiring a destination identifier from the to-be-communicated data message based on the virtual switch.

The virtual switch in the electronic device can acquire the destination identifier from the to-be-communicated data message.

S407: forwarding the to-be-communicated data message through the communication link to a destination corresponding to the destination identifier based on the virtual switch.

After acquiring the destination identifier, the virtual switch in the electronic device forwards the to-be-communicated data message through the communication link to the destination corresponding to the destination identifier, to achieve message communication.

In embodiments of the present disclosure, link negotiation is performed for the virtual machine and the switch respectively, the to-be-communicated data message is transmitted to the virtual switch through the virtual function port representor corresponding to the virtual function port in the virtual machine, the to-be-communicated data message is transmitted to the virtual switch through the uplink corresponding to the physical port in the data processing unit, and the to-be-communicated data message is obtained based on the virtual switch. Further, the communication link for the to-be-communicated data message is determined, where the communication link is a message channel between the virtual function part in the virtual machine, the virtual function port representor corresponding to the virtual function port in the virtual machine, the uplink corresponding to the physical port in the data processing unit, the physical port in the data processing unit, and the switch. Then, the destination identifier is acquired from to-be-communicated data message based on the virtual switch. Then, the to-be-communicated data message is forwarded through the communication link to the destination corresponding to the destination identifier based on the virtual switch. The present disclosure solves the problem of single point of failure in existing technologies. When one DPU card fails, another DPU card will take over traffic of the faulty card. The present disclosure eliminates single point of hardware failure by cross-card link aggregation of virtual function ports of DPUs, thus improving high availability in a production environment.

Figure 6:
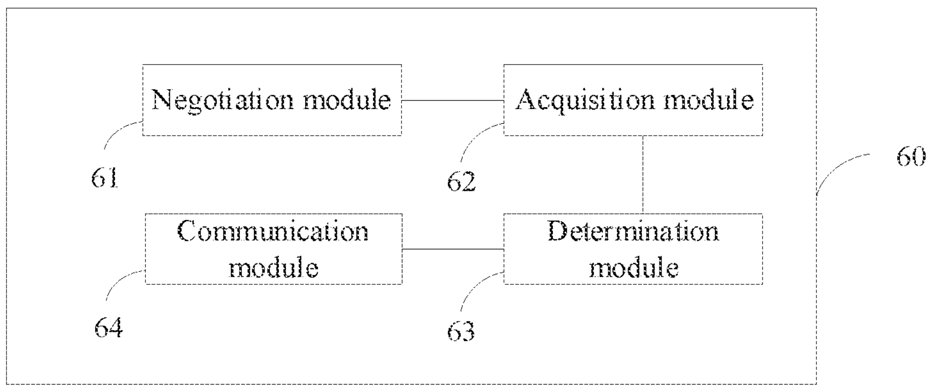
FIG. 6 is a schematic structural diagram of an apparatus for cross-card link aggregation of virtual function ports of DPUs provided in an embodiment of the present disclosure.

FIG. 6 is a schematic structural diagram of an apparatus for cross-card link aggregation of virtual function ports of DPUs provided in an embodiment of the present disclosure. The apparatus for cross-card link aggregation of virtual function ports of DPUs may be the electronic device in the above embodiments, or the apparatus for cross-card link aggregation of virtual function ports of DPUs may be a component in the electronic device. The apparatus for cross-card link aggregation of virtual function ports of DPUs provided in the embodiment of the present disclosure can execute the process flows provided in embodiments of the method for cross-card link aggregation of virtual function ports of DPUs. As shown in FIG. 6, the apparatus 60 for cross-card link aggregation of virtual function ports of DPUs includes: a negotiation module 61, an acquisition module 62, a determination module 63, and a communication module 64. The negotiation module 61 is configured to perform link negotiation for the virtual machine and the switch respectively; the acquisition module 62 is configured to acquire a to-be-communicated data message which includes a destination identifier, a source identifier, and a message type; the determination module 63 is configured to determine a communication link for the to-be-communicated data message, where the communication link is a message channel between a virtual function port in the virtual machine, a virtual function port representor corresponding to the virtual function port in the virtual machine, an uplink corresponding to a physical port in the data processing unit, the physical port in the data processing unit, and the switch; and the communication module 64 is configured to perform communication for the to-be-communicated data message based on the communication link.

Optionally, when performing link aggregation for the virtual machine and the switch respectively, the negotiation module 61 is specifically configured to: acquire a first negotiation message transmitted from the virtual machine and a second negotiation message transmitted from the switch; forward the first negotiation message and the second negotiation message to a link aggregation controller based on a virtual switch; process the first negotiation message and the second negotiation message based on the link aggregation controller, provide a first response protocol message to the virtual machine, and provide a second response protocol message to the switch.

Optionally, when providing the first response protocol message to the virtual machine and providing the second response protocol message to the switch, the negotiation module 61 is specifically configured to: transmit the first response protocol message and the second response protocol message to the virtual switch; forward, by the virtual switch, the first response protocol message to the virtual machine; and forward, by the virtual switch, the second response protocol message to the switch.

Optionally, the to-be-communicated data message includes at least one of: a first data message transmitted from the virtual machine or a second data message transmitted from the switch.

Optionally, when acquiring the to-be-communicated data message, the acquisition module 62 is specifically configured to: transmit the to-be-communicated data message to the virtual switch through the virtual function port representor corresponding to the virtual function port in the virtual machine; or transmit the to-be-communicated data message to the virtual switch through the uplink corresponding to the physical port in the data processing unit; and obtain the to-be-communicated data message based on the virtual switch.

Optionally, when determining the communication link of the to-be-communicated data message, the determination module 63 is specifically configured to: acquire a correspondence between a preset destination identifier and a preset communication link; and determine a communication link corresponding to the destination identifier in the to-be-communicated data message from the correspondence.

Optionally, when performing communication for the to-be-communicated data message based on the communication link, the communication module 64 is specifically configured to: acquire the destination identifier from the to-be-communicated data message based on the virtual switch; and forward the to-be-communicated data message through the communication link to a destination corresponding to the destination identifier based on the virtual switch.

The apparatus for cross-card link aggregation of virtual function ports of DPUs in the embodiment shown in FIG. 6 can be configured to execute the technical solutions of the above method embodiments, and has similar implementation principle and technical effects, which will not be repeated here.

Figure 7:
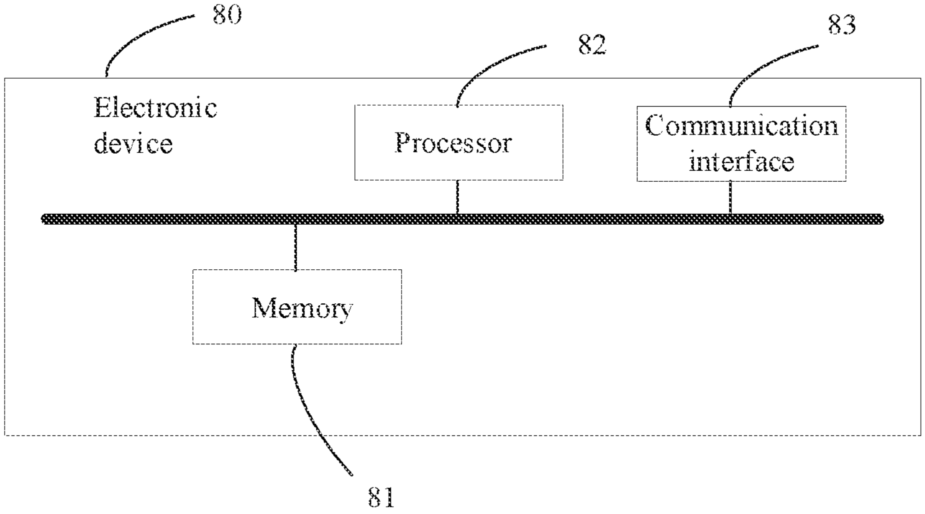
FIG. 7 is a schematic structural diagram of an electronic device provided in an embodiment of the present disclosure.

FIG. 7 is a schematic structural diagram of an electronic device provided in an embodiment of the present disclosure. The electronic device may be a terminal device, such as a computer, a notebook computer, or a vehicle computer. The electronic device provided in the embodiment of the present disclosure can execute the process flows provided in embodiments of the method for cross-card link aggregation of virtual function ports of DPUs. As shown in FIG. 7, the electronic device 80 includes: a memory 81, a processor 82, a computer program, and a communication interface 83. The computer program is stored in the memory 81, and is configured to execute, via the processor 82, the method for cross-card link aggregation of virtual function ports of DPUs as described above.

In addition, an embodiment of the present disclosure further provides a computer-readable storage medium storing a computer program thereon, where the computer program is executed by a processor to execute the method for cross-card link aggregation of virtual function ports of DPUs as described in the above embodiments.

In addition, an embodiment of the present disclosure further provides a computer program product, where the computer program product includes a computer program or instruction, and the computer program or instruction, when executed by a processor, implements the method for cross-card link aggregation of virtual function ports of DPUs as described above.

It should be noted that the above computer-readable medium in the present disclosure may be a computer-readable signal medium or a computer-readable storage medium, or any combination of the above two. An example of the computer-readable storage medium may include, but is not limited to: electric, magnetic, optical, electromagnetic, infrared, or semiconductor systems, apparatuses, elements, or a combination of any of the above. A more specific example of the computer-readable storage medium may include, but is not limited to: an electrical connection with one or more pieces of wire, a portable computer disk, a hard disk, a random-access memory (RAM), a read only memory (ROM), an erasable programmable read-only memory (EPROM or flash memory), an optical fiber, a portable compact disk read-only memory (CD-ROM), an optical memory, a magnetic memory, or any suitable combination of the above. In the present disclosure, the computer-readable storage medium may be any tangible medium containing or storing programs which may be used by, or used in combination with, a command execution system, apparatus, or element. In the present disclosure, the computer-readable signal medium may include a data signal in the base band or propagating as parts of a carrier wave, in which computer-readable program codes are carried. The propagating data signal may take various forms, including but not limited to an electromagnetic signal, an optical signal, or any suitable combination of the above. The computer-readable signal medium may also be any computer-readable medium except for the computer-readable storage medium. The computer-readable signal medium is capable of transmitting, propagating, or transferring programs for use by, or use in combination with, a command execution system, apparatus, or element. The program code contained on the computer-readable medium may be transmitted with any suitable medium, including but not limited to: wire, an optical cable, a RF (radio frequency) medium etc., or any suitable combination of the above.

In some embodiments, a client can communicate with a server using any network protocol that is known at present or is to be developed in the future, such as HTTP (HyperText Transfer Protocol), and can be interconnected with any form or medium of digital data communication (such as a communication network). Examples of communication networks include a local area network ("LAN"), a wide area network ("WAN"), extranet (e.g., Internet), and an end-to-end network (e.g., ad hoc end-to-end network), as well as any network that is known at present or is to be developed in the future.

The above computer-readable medium may be included in the above electronic device; or may be a stand-alone computer-readable medium without being assembled into the electronic device.

The above computer-readable medium stores one or more programs. The one or more programs, when executed by the electronic device, cause the electronic device to:

perform link negotiation for the virtual machine and the switch respectively;

acquire a to-be-communicated data message, which includes a destination identifier, a source identifier, and a message type;

determine a communication link for the to-be-communicated data message, where the communication link is a message channel between a virtual function port in the virtual machine, a virtual function port representor corresponding to the virtual function port in the virtual machine, an uplink corresponding to a physical port in the data processing unit, the physical port in the data processing unit, and the switch; and perform communication on the to-be-communicated data message based on the communication link.

In addition, the electronic device can further perform other steps in the method for cross-card link aggregation of virtual function ports of DPUs as described above.

A computer program code for executing operations in the present disclosure may be compiled using one or more programming languages or combinations thereof. The above programming languages include, but are not limited to, object-oriented programming languages, such as Java, Smalltalk or C++, and also include conventional procedural programming languages, such as "C" language, or similar programming languages. The program code may be completely executed on a user's computer, partially executed on a user's computer, executed as a separate software package, partially executed on a user's computer and partially executed on a remote computer, or completely executed on a remote computer or server. In the case where a remote computer is involved, the remote computer may be connected to a user computer through any kind of networks, including a local area network (LAN) or a wide area network (WAN), or may be connected to an external computer (for example, connected through the Internet using an Internet service provider).

The flow charts and block diagrams in the figures illustrate architectures, functions and operations that may be implemented according to the systems, methods, and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, functions annotated in the blocks may also occur in a sequence different from the sequence annotated in the figures. For example, any two blocks presented in succession may be executed substantially in parallel, or sometimes be executed in a reverse sequence, depending on the functions involved. It should also be noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by software, or may be implemented by hardware. The names of the units do not constitute a limitation to such units themselves in some cases.

The functions described above herein may at least partially be executed by one or more logical components of hardware. For example, non-restrictively, usable exemplary types of the logical components of hardware include: a field programmable gate array (FPGA), an application specific integrated circuit (ASIC), an application specific standard product (ASSP), a system-on-a-chip system (SOC), a loading programmable logic device (CPLD), and so on.

In the context of the present disclosure, the machine-readable medium may be a tangible medium which may contain or store a program for use by, or use in combination with, an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any appropriate combination of the above. A more specific example of the machine-readable storage medium will include an electrical connection based on one or more pieces of wire, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of the above.

It should be noted that relational terms such as "first" and "second" are only used to distinguish one entity or operation from another entity or operation, and do not necessarily request or imply existence of any actual relationship or sequence between these entities or operations. Further, the terms such as "comprising", "including" or any other variation thereof are intended to encompass non-exclusive inclusions, such that a process, a method, an article, or a device that includes a series of elements not only includes those elements, but also includes other elements that are not explicitly listed, or further includes elements that are inherent to such a process, a method, an article, or a device. Without more constraints, an element defined by the wording "comprises a . . . " does not preclude the existence of additional identical elements in the process, the method, the article, or the device that includes the element.

The above description only provides specific embodiments of the present disclosure, so that those skilled in the art can understand or implement the present disclosure. Various modifications to these embodiments will be apparent to those skilled in the art, and the general principles defined herein can be implemented in other embodiments without departing from the spirit or scope of the present disclosure. Therefore, the present disclosure will not be limited to the embodiments described herein, but will conform to the widest scope consistent with the principles and novel features disclosed herein.

What is claimed is:

1. A method for cross-card link aggregation of virtual function ports of data processing units, wherein each of the data processing units is communicatively connected to a virtual machine and a switch respectively, the method comprising:

performing link negotiation for the virtual machine and the switch respectively;

acquiring a to-be-communicated data message which comprises a destination identifier, a source identifier, and a message type;

determining a communication link for the to-be-communicated data message, wherein the communication link is a message channel between a virtual function port in the virtual machine, a virtual function port representor corresponding to the virtual function port in the virtual machine, an uplink corresponding to a physical port in the data processing unit, the physical port in the data processing unit, and the switch; and performing communication for the to-be-communicated data message based on the communication link;

wherein the performing link negotiation for the virtual machine and the switch respectively comprises:

acquiring a first negotiation message transmitted from the virtual machine and a second negotiation message transmitted from the switch;

forwarding the first negotiation message and the second negotiation message to a link aggregation controller based on a virtual switch; and processing the first negotiation message and the second negotiation message based on the link aggregation controller, providing a first response protocol message to the virtual machine, and providing a second response protocol message to the switch.

2. The method according to claim 1, wherein the providing the first response protocol message to the virtual machine, and providing the second response protocol message to the switch comprises:

transmitting the first response protocol message and the second response protocol message to the virtual switch;

forwarding, by the virtual switch, the first response protocol message to the virtual machine; and forwarding, by the virtual switch, the second response protocol message to the switch.

3. The method according to claim 1, wherein the to-be-communicated data message comprises at least one of:

a first data message transmitted from the virtual machine or a second data message transmitted from the switch.

4. The method according to claim 1, wherein the acquiring the to-be-communicated data message comprises:

transmitting the to-be-communicated data message to the virtual switch through the virtual function port representor corresponding to the virtual function port in the virtual machine; or transmitting the to-be-communicated data message to the virtual switch through the uplink corresponding to the physical port in the data processing unit; and obtaining the to-be-communicated data message based on the virtual switch.

5. The method according to claim 1, wherein the determining the communication link for the to-be-communicated data message comprises:

acquiring a correspondence between a preset destination identifier and a preset communication link; and determining a communication link corresponding to the destination identifier in the to-be-communicated data message from the correspondence.

6. The method according to claim 1, wherein the performing communication for the to-be-communicated data message based on the communication link comprises:

acquiring the destination identifier from the to-be-communicated data message based on the virtual switch; and forwarding the to-be-communicated data message through the communication link to a destination corresponding to the destination identifier based on the virtual switch.

7. An electronic device, comprising:

a memory;

a processor; and a computer program;

wherein the computer program is stored in the memory, and is configured to be executed by the processor to implement a method for cross-card link aggregation of virtual function ports of data processing units, each of the data processing units being communicatively connected to a virtual machine and a switch respectively, the method comprising:

performing link negotiation for the virtual machine and the switch respectively;

acquiring a to-be-communicated data message which comprises a destination identifier, a source identifier, and a message type;

determining a communication link for the to-be-communicated data message, wherein the communication link is a message channel between a virtual function port in the virtual machine, a virtual function port representor corresponding to the virtual function port in the virtual machine, an uplink corresponding to a physical port in the data processing unit, the physical port in the data processing unit, and the switch; and performing communication for the to-be-communicated data message based on the communication link;

wherein the performing link negotiation for the virtual machine and the switch respectively comprises:

acquiring a first negotiation message transmitted from the virtual machine and a second negotiation message transmitted from the switch;

forwarding the first negotiation message and the second negotiation message to a link aggregation controller based on a virtual switch; and processing the first negotiation message and the second negotiation message based on the link aggregation controller, providing a first response protocol message to the virtual machine, and providing a second response protocol message to the switch.

8. The electronic device according to claim 7, wherein the providing the first response protocol message to the virtual machine, and providing the second response protocol message to the switch comprises:

transmitting the first response protocol message and the second response protocol message to the virtual switch;

forwarding, by the virtual switch, the first response protocol message to the virtual machine through the virtual switch; and forwarding, by the virtual switch, the second response protocol message to the switch.

9. The electronic device according to claim 7, wherein the to-be-communicated data message comprises at least one of:

a first data message transmitted from the virtual machine or a second data message transmitted from the switch.

10. The electronic device according to claim 7, wherein the acquiring the to-be-communicated data message comprises:

transmitting the to-be-communicated data message to the virtual switch through the virtual function port representor corresponding to the virtual function port in the virtual machine; or transmitting the to-be-communicated data message to the virtual switch through the uplink corresponding to the physical port in the data processing unit; and obtaining the to-be-communicated data message based on the virtual switch.

11. The electronic device according to claim 7, wherein the determining the communication link for the to-be-communicated data message comprises:

acquiring a correspondence between a preset destination identifier and a preset communication link; and determining a communication link corresponding to the destination identifier in the to-be-communicated data message from the correspondence.

12. The electronic device according to claim 7, wherein the performing communication for the to-be-communicated data message based on the communication link comprises:

acquiring the destination identifier from the to-be-communicated data message based on the virtual switch; and forwarding the to-be-communicated data message through the communication link to a destination corresponding to the destination identifier based on the virtual switch.

13. A computer-readable non-transitory storage medium, storing a computer program, wherein the computer program, when executed by a processor, implements a method according to claim 1 for cross-card link aggregation of virtual function ports of data processing units.

* * * * *